Sept. 13, 1966
J. R. EHRLICH
3,272,641
FROSTING COMPOSITION
Filed Feb. 6, 1963
⅓ Natural Size
INVENTOR.
Joseph R. Ehrlich

United States Patent Office 3,272,641
Patented Sept. 13, 1966

3,272,641
FROSTING COMPOSITION
Joseph R. Ehrlich, 1793 Riverside Drive,
New York, 34, N.Y.
Filed Feb. 6, 1963, Ser. No. 256,756
6 Claims. (Cl. 106—238)

The object of this invention is a liquid frosting compound which can be brushed, sprayed or otherwise spread over a solid surface to create a frosted effect on said surface, after the liquid has dried.

Another object of the invention is to provide a quickly developing frosted effect, to be finished and dry within one to several minutes.

A further object of the invention is to provide frosted effect of a definite character, forming translucent, fan- and leaf-like, relatively large patterns, consisting of connected, but individual fields in sizes ranging from about one-half to about 15 square inches or more, sometimes with clearly visible borderlines, and containing long, needle-like crystals ranging from ½-inch to several inches in length.

Still another object of the invention is to make a temporary frosting, e.g. for decorative purposes, on window panes, mirrors, etc. which will resist high humidity, heat, light, cold, steam and steam condensation, yet can be removed by washing with water and, preferably, with soap and/or detergents and wiping with a towel, sponge, etc.

Many methods are known to create frosted effects on metal, glass, plastic, etc. They are either used for creating a permanent decorative effect or a temporary effect such as making imitation "ice flowers" on windows. Materials have been proposed to create such effects ranging from lacquers, containing compounds such as triphenyl phosphate, p-dichlorobenzene, styrene glycol, aceto aceto-anisidide or other organic compounds capable of crystallizing in an appropriate vehicle, to inorganic compounds, crystallizing simply from a water solution, such as magnesium sulfate, sodium sulfate or aluminum potassium sulfate; sometimes such solutions contain small amounts (1%–2%) of gum arabic, dextrin, gelatin and the like.

There are many materials which have the tendency to crystallize in certain shapes from their solutions in water or other solvents. The nature of the solvent, the concentration of the solute and even the way of spreading have a certain influence on the speed and shape of crystal growth; however, the differences of these properties for a given material under those varying conditions are not too significant.

I have found that urea crystallizes from water solutions to form thin needles, mostly about ¼ to 1 inch long. The crystal formation is quicker and nicer, when about 1 percent of gelatin is dissolved together with at least 20% to 30% of urea in water. Instead of gelatin other growth accelerators can be used, such as gum arabic, sodium carboxymethylcellulose, dextrin, etc., but not with as good results. But all those frosting patterns do not display closed fields, their needles being slightly too far apart and they are all too sensitive to moisture. Spread on the inside of a window pane in winter time the frosting easily disappears when the window panes have become dimmed with moisture.

As the solubility of urea in most sovlents is rather poor it is difficult ot incorporate it into lacquer type vehicles. When urea is dispersed in latex type vehicles such dispersions yield milky coatings without any signs of crystallization to speak of.

I have succeeded in finding vehicles for urea which permit the rapid growth of glossy, fabulously long needles up to 5 inches long or more, which arrange themselves closely together in fan-like, petal- or leaf-like fields.

When such a frosting liquid is sprayed from a pressure can onto a smooth surface, crystals start to grow within a minute from various points of the wet surface. When they grow from two or more centers towards each other the contact points form distinctive lines which border individual fields, thus giving a very pleasing effect. (See drawing.)

To prepare these frosting liquids I use various water-insoluble resins which contain free acid groups, said resins being soluble in diluted alkalies and other bases, urea, and a volatile, water soluble base, such as ammonium hydroxide or a water-soluble, volatile amine. To further accelerate the growth of the crystals I prefer to add considerable amounts of a saturated aliphatic alcohol, containing up to 3 carbon atoms, or a combination of such alcohols with each other or with acetone. The lowest member of this group of alcohols, viz. methanol permits the highest concentration of urea combined with the lowest water content, yielding the fastest growing patterns.

The resins for the purpose of this invention can be copolymers of styrene with maleic anhydride or their half esters with alcohol, copolymers of polymerized rosin and maleic anhydride, rosin-maleic acid adducts, copolymers of vinyl acetate with either maleic or crotonic acid, copolymers of polyester resins with maleic anhydride and other resins, all containing free acid groups. In place of ammonium hydroxide I can use volatile amines with a low boiling point.

A few selected examples will give a better understanding of the possible compositions of these frosting liquids.

*Example 1*

59.5 parts by weight of methanol,
8.0 parts by weight of water,
3.0 parts by weight of ammonium hydroxide (28%–30% ammonium) are mixed together.

In this mixture is dissolved with strong agitation at room temperature 8.5 parts by weight of pulverized polymerized rosin ester of maleic acid with free maleic acid groups, said resin having an acid number of about 190–220, and a softening point close to 170° C. When all the resin is dissolved, 21 parts by weight of urea are added under agitation until completely dissolved. The final solution can be contained in aerosol cans, using carbondioxide under 85 lbs. of pressure as propellant. When this liquid is sprayed from such pressure can onto a glass pane from about 1-foot distance at room temperature, an area of about 8 x 10 inches will be frosted and dry in approximately 1 to 2 minutes. The needle-like crystals might reach lengths up to 5 inches or more.

A resin as described in this example is commercially available in the United States of America under the name of Pentalyn 255, made by Hercules Powder Co., Wilmington, Del. However, other polymerized rosin-maleic ester resins with different softening points and/or different acid numbers could be used instead, as long as a sufficient quantity is soluble in the water-ammonia-alcohol blend, to secure a satisfactory result. The frosting pattern is resistant to humidity and steam which might occur for example in a warm, steamy bathroom. While the frosting pattern might temporarily disappear under prolonged influence of steam, it re-constitutes itself quickly as soon as normal humidity conditions return.

*Example 2*

59.5 parts by weight methanol
8.0 parts by weight water
4.0 parts by weight ammonium hydroxide (28%–30%)
8.0 parts by weight copolymer of styrene-maleic anhydride
20.5 parts by weight urea Procedure is the same as described in Example 1.

The copolymer in this example is a short chain linear polyanhydride with an average length of 8 molecules, $$(C_6H_5.CH.CH_2.C_2H_2(CO)_2.O)_8$$

and an average molecular weight of 1600, an acid number of 500, and a melting range of 165°–180° C. Properties and application of the final solution are similar to those described in Example 1, with respect to crystal formation, except that the frosting pattern, after being exposed to steam, takes considerable time to re-constitute itself. This frosting pattern is more sensitive to steam than that described in Example 1. However, it becomes less sensitive if the styrene-maleic anhydride copolymer in above example is replaced by a 100% one-half ester (one gram mole of alcohol to one gram mole of styrene-maleic anhydride) or a 75% one-half ester of the copolymer of styrene-maleic anhydride. Such half-esters have acid numbers lower than 500, and their melting range also tends to be lower than 165° C. Instead of low-chain styrene-maleic anhydride copolymers or their half esters, styrene-maleic anhydride copolymers of higher molecular weight and/or reduced anhydride functionality can be used. The two latter, because of their higher viscosity and somewhat reduced solubility, respectively, in ammonium hydroxide or volatile amines, require a somewhat reduced ratio in the above formula.

*Example 3*

59.1 parts by weight methanol
9.15 parts by weight water
3.70 parts by weight ammonium hydroxide 28%–30%
8.30 parts by weight thermoplastic maleic anhydride polyester-resin
20.75 parts by weight urea Procedure is similar to that described in Example 1. The resin is a thermoplastic polyester resin with free maleic acid groups, a softening point of approximately 174° C. and an average acid number of 200.

This particular type resin is available under the designation "Durez 19788" from the Durez Plastic Division of Hooker Chemical Corp., North Tonawanda, N.Y. Other thermoplastic polyester type resins made either by the same or other companies can be used instead, as long as they contain free maleic acid groups and are soluble in ammonium hydroxide to a similar degree as in the above formula. The final solution behaves in a way similar to that described in Example 1.

*Example 4*

50.0 parts by weight isopropanol
19.0 parts by weight water
4.5 parts by weight ammonium hydroxide
7.5 parts by weight polymerized rosin-maleic acid ester
19.0 parts by weight urea Procedure is similar to Example 1. Pattern develops within 2–5 minutes. The resin is the same as in Example 1.

*Example 5*

55.4 parts by weight denatured ethylalcohol
5.3 parts by weight ammonium hydroxide 28%–30%
9.8 parts by weight water
8.5 parts by weight resin as in Example 1
21.0 parts by weight urea Procedure similar to Example 1. Pattern develops within 2–3 minutes.

*Example 6*

20.0 parts by weight acetone
13.0 parts by weight isopropanol
35.0 parts by weight water
4.0 parts by weight ammonium hydroxide 29%
7.0 parts by weight resin as in Example 1
21.0 parts by weight urea Procedure similar to Example 1. Pattern develops within 2 minutes.

*Example 7*

65.0 parts by weight water
5.4 parts by weight ammonium hydroxide 29%
8.6 parts by weight resin as in Example 1
21.0 parts by weight urea NH$_4$OH is added to water, resin and urea added together and dissolved with vigorous agitation. Pattern develops slower than in the previously described examples, may take from 3 to 8 minutes.

*Example 8*

59 parts by weight methanol
10 parts by weight water
5 parts by weight ammonium hydroxide
7 parts by weight vinyl acetate-crotonic acid copolymer
19 parts by weight urea Procedure similar to Example 1. The resin is a medium viscosity copolymer of 97% vinyl acetate and 3% crotonic acid. The pattern develops within 3–5 minutes.

The vinyl copolymers with maleic or crotonic acid which I can use contain from 1% to 5% acid and 99% to 95% vinyl acetate. Some examples of water soluble, volatile amines which I can use in place of ammonia are: ethylamine, diethylamine, isopropylamine.

Due to evaporation of ammonia during manufacturing operations the final solution in Examples 1 to 8 may actually contain as little as 2% ammoniumhydroxide or about 0.6% ammonia, without the resin precipitating from the solution.

To enhance the appearance of the crystals it is possible to add a soluble dyestuff to the frosting solution.

After having given a number of examples as a guide of how to prepare such frosting solutions I wish now to state the scope of my invention.

I make quick forming frosting patterns of the special shape and appearance as shown on the drawing on smooth surfaces of glass, porcelain, metal, plastic, etc., by letting urea, which is quite soluble in water, but has a rather limited solubility in a few alcohols and almost no solubility in most organic solvents, crystallize in a resinous medium which, after evaporation of the solvent, is insoluble in water. This way the urea crystals attain a considerable resistance to humidity and the capability to reconstitute themselves into the same pattern into which they have originally formed, should they temporarily disappear under the influence of excess steam. To achieve this goal I use resins which are insoluble in water, but soluble by temporary chemical salt formation in volatile bases, such as ammonium hydroxide or water soluble, volatile amines. On drying, the water soluble salts decompose, the volatile bases evaporate and leave the water insoluble resin behind. Any water insoluble resin with a sufficiently high acid number or containing free acid groups to dissolve in water, containing from .6%–20% ammonia (NH$_3$) and which forms temporary water soluble salts with volatile water soluble bases can be used. I prefer to use resins containing free maleic acid groups. I can also use polyvinyl acetate-crotonic acid copolymers containing not more than five percent crotonic acid. Though I can use any resin with the described properties I prefer those which do not form self-supporting films, because the urea crystallizes in them faster than in those which form self-supporting, continuous films. Less than 3% resin will not provide for sufficient resistance to humidity and will not yield the desired type of pattern; more than 20% resin makes the rapid formation of crystals difficult. I prefer urea concentrations which are close to 20%, though I can get a frosted pattern with an urea concentration as low as 10 percent. When 10% urea and only 4% resin is used and the alcohol is methanol no other water than that in the ammonium hydroxide is necessary. A possible formula would be:

10 parts urea
4 parts resin
2 parts ammonium hydroxide
84 parts methanol—all by weight.

Naturally, the solutions may also contain more than 20% urea, say 25% or 30%. The result would be a still faster forming pattern, more opacity and a somewhat decreased resistance to humidity. The frosting, in spite of its good resistance to humidity, can be washed off with water and wiping, which is an important property with regard to its use as window decoration, which is one of the main applications. Another important factor is the low cost of the composition.

Having described the nature of the invention, I claim the following:

1. A sprayable liquid which, when sprayed on smooth surfaces, forms rapidly growing leaf-like and fan-like crystal patterns with long needles, said patterns being resistant to moisture in that they are self-reconstitutable but being removable by water, said liquid comprising:
   (a) from about 2 to 84 parts by weight of water;
   (b) at least 0.6 part by weight of water soluble volatile base selected from the group consisting of ammonia and an amine of sufficient volatility that when said liquid is sprayed on smooth sufaces said amine evaporates therefrom;
   (c) from about 4 to 20 parts by weight of a water-insoluble resin, said resin containing free acid groups capable of reacting with said water-soluble volatile base to form a water-soluble salt of said resin, and said resin having a sufficiently high acid number to dissolve in water containing at least 0.6% by weight of ammonia; and
   (d) from about 10 to 30 parts by weight of urea; whereby said resin forms a water-soluble salt by reaction with said water-soluble volatile base.

2. A sprayable liquid in accordance with claim 1, containing at least one saturated, aliphatic alcohol up to substantially 84% by weight, said alcohol having from 1 to 3 carbons.

3. A sprayable liquid according to claim 1 containing acetone up to substantially 20% by weight.

4. A sprayable liquid according to claim 1 wherein the water-insoluble resin contains free maleic acid groups.

5. A sprayable liquid according to claim 1 wherein the water-insoluble resin is a copolymer of 95% to 99% vinylacetate and 5% to 1% crotonic acid.

6. A sprayable liquid according to claim 1 wherein the water-insoluble resin has free maleic acid groups and is selected from the group consisting of copolymers of styrene with maleic anhydride, copolymers of styrene with half esters of maleic anhydride with alcohol, copolymers of polymerized rosin and maleic anhydride, rosin-maleic acid adducts, copolymers of vinyl acetate with maleic acid, and copolymers of polyester resins with maleic anhydride.

References Cited by the Examiner

UNITED STATES PATENTS

| | | | |
|---|---|---|---|
| 3,062,686 | 11/1962 | Graulich et al. | 260—29.6 |
| 3,100,755 | 8/1963 | Ehrlich | 260—29.6 |

MORRIS LIEBMAN, *Primary Examiner.*

ALEXANDER H. BRODMERKEL, *Examiner.*

L. HAYES, *Assistant Examiner.*